March 9, 1943.　　P. VAN SITTERT ET AL　　2,313,603
NUT SETTER
Filed Dec. 12, 1941
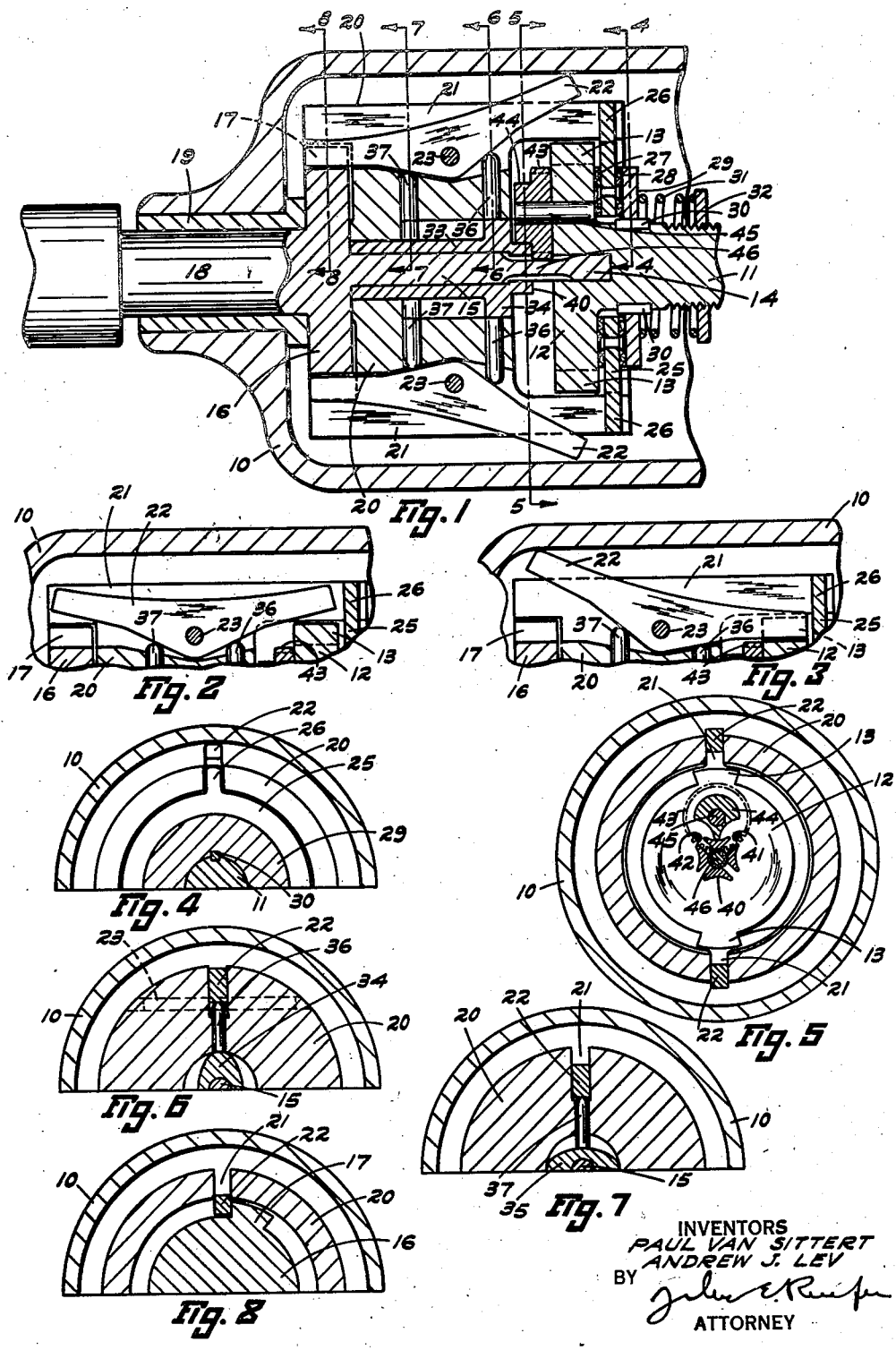
INVENTORS
PAUL VAN SITTERT
ANDREW J. LEV
BY
ATTORNEY Patented Mar. 9, 1943

2,313,603

UNITED STATES PATENT OFFICE 2,313,603

NUT SETTER

Paul Van Sittert, Shaker Heights, and Andrew J. Lev, Garfield Heights, Ohio, assignors to The Cleveland Pneumatic Tool Company, Cleveland, Ohio, a corporation of Ohio Application December 12, 1941, Serial No. 422,711

4 Claims. (Cl. 192—30.5)

This invention relates to nut setters, that is to say, power tools for turning down and tightening nuts or the like. More particularly, the invention covers a tool of this character which operates by intermittent impact after the resistance to rotation of the driven member reaches a predetermined value.

One of the objects of the invention is the provision of a tool in which impacts are transmitted to the work from a flywheel which has a friction connection only with the motor at the times when the impacts are delivered.

Another object is the provision of means for positively clutching a flywheel to the driving and driven members alternately, said means affording ample opportunity for the flywheel to gain momentum between the delivery of impacts.

Other objects and features of novelty will appear as we proceed with the description of that embodiment of the invention which, for the purposes of the present application, we have illustrated in the accompanying drawing, in which:

Fig. 1 is a fragmental view, principally in central longitudinal section, of a power tool embodying the invention;

Figs. 2 and 3 are detail sectional views corresponding to a portion of Fig. 1, showing one of the pivoted clutch bars in positions different from that of Fig. 1; and Figs. 4, 5, 6, 7, and 8 are cross-sectional views on a smaller scale taken substantially on the lines 4—4, 5—5, 6—6, 7—7, and 8—8 of Fig. 1.

Referring particularly to Fig. 1 of the drawing, a portion of the housing of the nut setter is shown at 10. This housing also encloses a motor, not shown, having a shaft 11 terminating in a plate 12 that is provided at diametrically opposite points with a pair of outwardly protruding clutch dogs 13. The plate 12 and shaft 11 are recessed axially to receive rotatably the constricted end 14 of a shaft 15 which projects from a second plate 16 that is also provided with a pair of diametrically opposed outwardly projecting clutch dogs 17 similar to the dogs 13. Plate 16 is carried by a shaft 18 journaled in a bushing 19 that is mounted in housing 10, the shaft 18 and the plate 16 constituting the driven member of the tool to which a socket wrench, not shown, may be connected.

A generally cylindrical flywheel 20 is provided at its ends with recesses in which the plates 12 and 16 are located. At opposite points this flywheel is slotted longitudinally, and in the slots 21 a pair of clutch bars 22 are pivotally mounted on pins 23. When these clutch bars are swung to the position illustrated in Fig. 1, they are adapted to engage the clutch dogs 17 on plate 16 and to impart rotary movement from the flywheel to the driven member. On the other hand when the clutch bars are swung to the position of Fig. 3, they are adapted to be engaged by by the clutch dogs 13 on plate 12, and thus to establish positive driving connections from the motor to the flywheel.

The clutch bars 22 constitute the only means for rotatably connecting the flywheel with the driven member, but as between the driver and the flywheel, there is in addition to the positive drive connection above described, a friction connection which tends to rotate the flywheel whenever the drive shaft 11 rotates, but which yields or slips when the load reaches a predetermined minimum. To this end we provide an annular disk 25 having diametrically opposed projections 26 which extend into the slots 21 so that the disk 25 must always turn with the flywheel. Friction rings 27 and 28 are riveted or otherwise secured to disk 25, ring 27 bearing against a surface of plate 12 and ring 28 bearing against a metal ring 29 which is slidable upon shaft 11 but prevented from turning relative to the shaft by keys 30. Disk 25 with its friction rings 27 and 28 is confined between plate 12 and ring 29, a coil spring 31 being employed to force these parts together and the degree of friction exerted being controlled by a ring 32 which is threaded onto shaft 11.

Surrounding shaft 15 and rotatable with respect to that shaft, as well as with respect to the flywheel 20, there is a sleeve 33 which includes integral cams 34 and 35. These two cams are identical in form and size but are spaced angularly 90° apart. Two pairs of pins 36 and 37 positioned in radial bores in the flywheel engage the cams 34 and 35 and by them are slidable in and out, one pair in opposition to the other. The outer ends of these pins are rounded and engage the two clutch bars 22 upon opposite sides of their pivots 23. By this means the bars 22 are swung from one operative position to the other.

Sleeve 33 at its inner end beyond cam 34 is formed as a Geneva movement wheel 40, the radial slots of which are adapted to be engaged by pins 41 and 42 carried by a gear 43. The latter gear also carries a locking element 44 of familiar form cooperating with the wheel 40 to hold it against relative rotation except at times when one of the pins is in engagement with a slot of the wheel. Gear 43 turns upon a short shaft 45 which is fixed in plate 12, and meshes with a pinion 46 cut in shaft 14.

*Operation.*—Assuming that the parts are in the positions illustrated in Fig. 1 and that the tool is held in position to drive a nut, when the operator starts the motor which turns driving member 11—12 in clockwise direction in Fig. 4, rotation is imparted through disk 25 and projections 26 to the flywheel 20, and from the flywheel through the clutch bars 22 to plate 16 and the driven member 18.

If, when the power is turned on, the clutch bars 22 happen to be in the position illustrated in Fig. 3, motion is transmitted to the then free flywheel not only by the friction connection, but also positively through the clutch dogs 13 and the clutch bars 22. Gear 43 revolves, running upon pinion 46, which will cause the Geneva movement to function in a manner presently to be described to throw the clutch bars to the position of Fig. 1, whereupon drive through the friction connection to the flywheel and thence between dogs 17 and clutch bars 22 to the plate 16 and shaft 18 will take place.

All of the parts will then rotate as a unit, continuing until the resistance to rotation set up by the nut as it is tightened on the bolt reaches a predetermined value, when the shaft 18—15 will stand still. The flywheel likewise will stand still and the friction plate 25 with its rings 27 and 28 will slip between the plate 12 and the ring 29. Shaft 11 continuing to rotate in clockwise direction in Fig. 4 will cause the gear 43 to turn upon the then stationary pinion 46 in the same direction as the shaft 11, that is, in counterclockwise direction in Fig. 5, while the Geneva wheel which is integral with the sleeve 33 will be locked against rotation by the rotating locking element 44, thereby maintaining the wheel in proper position to receive one of the pins carried by the gear 43. As the gear 43 continues its rotation in counterclockwise direction in Fig. 5, the pin 42 will move into the adjacent slot of the Geneva wheel 40 to rotate the latter 90°, the locking element 44 being now positioned with one of its concaved portions above the wheel to enable rotation of the wheel. The 90° rotation of the Geneva wheel is of course transmitted to the sleeve 33 and results in the rotation of the cams 34 and 35 to reverse their relative positions, causing the pins 36 and 37 to swing the bars 22 from their Fig. 1 position through their Fig. 2 position to their Fig. 3 position. As soon as the Fig. 2 position is reached and the flywheel is freed from the driven member, slippage in the friction drive will decrease. The bars 22 will be in position to engage dogs 13 on clutch plate 12, but by the time this occurs, the flywheel will have picked up some speed and the shock of bars 22 engaging dogs 13 will be lessened.

Shaft 11 and flywheel 20 will now rotate together. The gear ratio between pinion 46 and gear 43 is calculated to enable the shaft 11 and the plate 12 to revolve about three times before the pin 41 engages one of the slots of the Geneva wheel 40. During this relative rotation, the Geneva wheel is locked against accidental rotation by the largest convexed portion of the locking element 44 engaging the wheel. As the pin 41 enters one of the slots of the Geneva wheel, it will turn the wheel as well as the sleeve 33 through another 90° angle with respect to the flywheel. When this occurs, the cams 34 and 35 and the pins 36 and 37 will again tilt the clutch bars 22 to the Fig. 1 position, freeing the flywheel from the driving member and causing it to deliver a rotary impact to the driven member. As soon as this occurs, the flywheel stops while the shaft 11 and gear 43 continue to rotate. Due to the relatively small angle between the pins 41 and 42, the pin 42 will again enter one of the slots of the Geneva wheel after a relatively short period of rotation of the shaft 11 with respect to the flywheel, causing the Geneva wheel and sleeve 33 to rotate 90° for again tilting the clutch bars 22 to the Fig. 3 position and starting a new cycle. In this manner a series of rotary impacts are delivered to the driven member and the nut which is being driven is tightened down securely upon its bolt.

The fact that the motor shaft and the flywheel are permitted to continue in driving relation through several revolutions, thereby enabling the flywheel to gain considerable momentum while the flywheel and driven member remain in operative relation long enough only to transmit an impact, constitutes an important feature of the invention.

As will be obvious, the tool is so designed that by reversing the motor, a nut may be unthreaded. In such a case, however, the series of impacts will be delivered as the first part of the operation and continuous rotation will begin after the nut is sufficiently loosened.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

Having thus described our invention, we claim:

1. In a nut setter, a driver, a flywheel, a driven member, means for clutching together the driver and flywheel or the driven member and flywheel alternately, cam means for shifting said clutching means from one operative position to the other, and means comprising a Geneva movement operated by relative rotation of the driver and driven member for turning said cam means intermittently.

2. In a nut setter, a driver, a flywheel, a driven member, means for clutching together the driver and flywheel or the driven member and flywheel alternately, cam means for shifting said clutching means from one operative position to the other, gearing connections operated by relative rotation of the driver and driven member for rotating said cam means relatively to said flywheel at spaced instants and locking the cam means and flywheel against relative rotation during the interval between said instants.

3. In a nut setter, a driver, a flywheel, a driven member, means for clutching together the driver and flywheel or the driven member and flywheel alternately, cam means for shifting said clutching means from one operative position to the other, and means comprising a Geneva movement operated by relative rotation of the driver and driven member for turning said cam means intermittently, said means being arranged to maintain the driver and flywheel in engagement longer than the flywheel and driven member.

4. In a nut setter, a driver, a flywheel, a driven member coaxial with the driver and flywheel, a clutch bar pivotally mounted in the flywheel and extending beyond both ends thereof, said clutch bar being shiftable on its pivot to clutch together the driver and flywheel or the flywheel and driven member alternately, rotary cam means for shifting said clutch bar, and means functioning in response to relative rotation of the driver and driven member for turning said cam means to effect shifting of said clutch bar.

PAUL VAN SITTERT.
ANDREW J. LEV.